AUTOMATIC GAIN CONTROL SYSTEM

Filed Dec. 1, 1948 2 SHEETS—SHEET 1

INVENTOR
Alda V. Bedford
BY
[signature]
ATTORNEY

May 5, 1953 A. V. BEDFORD 2,637,773

AUTOMATIC GAIN CONTROL SYSTEM

Filed Dec. 1, 1948 2 SHEETS—SHEET 2

INVENTOR
Alda V. Bedford
BY
ATTORNEY

Patented May 5, 1953 2,637,773

UNITED STATES PATENT OFFICE 2,637,773

AUTOMATIC GAIN CONTROL SYSTEM

Alda V. Bedford, Princeton, N. J., assignor to Radio Corporation of America, a corporation of Delaware Application December 1, 1948, Serial No. 62,862

3 Claims. (Cl. 178—7.3)

The present invention relates to automatic gain control systems for radio receiving systems and pertains more directly, although not necessarily limited thereto, to automatic gain control circuits for use in radio receiving systems adapted to receive and demodulate a radio carrier modulated by a composite wave including a periodically recurrent synchronizing component representing a fixed percentage of radio carrier modulation.

In more particularity, the present invention deals with a new and improved form of automatic gain control system for television receivers which through the novel utilization of an amplitude discriminatory wave communication circuit in combination with an integrating network connected for integration of energy communicated by the amplitude discriminatory circuit, acts to develop a receiver gain control voltage virtually free from noise effects and with sufficient accuracy to maintain the peak-to-peak amplitude of the demodulated television signal substantially constant for large variations in television receiver input signal.

It is commonly known that automatic gain control circuits for use in television receiving equipment differ greatly from the more frequently encountered automatic gain control circuits embodied in receivers for sound broadcast signals. In the instance of the usual broadcast receiver for receiving amplitude modulated carriers, it is considered adequate that the automatic gain control potential be produced by electrical information gleaned from the average carrier intensity of the received radio signal. Such an automatic gain control circuit would not, however, be satisfactory for controling the gain of television receiver amplifier channels as the average signal strength of the television radio frequency carrier is normally a function of the average image or picture brilliance, sometimes referred to as "background level." Development of automatic gain control voltage in accordance with the average signal strength of the received radio carrier would then cause the gain to be altered not only in accordance with the signal intensity variations of the radio carrier, due to undesirable fading or other atmospheric phenomenon, but also in accordance with the average picture brilliance of the image being transmitted.

Radio transmitted "negative modulated" television signals normally include blanking pulses or black level information which is transmitted between each image line in combination with the line synchronizing pulse. This line sync pulse is most commonly superimposed upon the black level signals and these data are transmitted at some respectively constant but different relative carrier levels. In common television practice the sync pulse is transmitted at practically full carrier intensity or 100 per cent carrier amplitude, while the black level or blank out pulse is transmitted at approximately 75 per cent of the full carrier amplitude. It has been the general practice in some television receiver design to utilize a form of a peak rectifier AGC system which responds to those peak pulses of energy represented by the blanking and synchronizing signals during the synchronizing intervals. By this means, there is then developed an automatic gain control potential for desirably altering the gain of the receiver in accordance with the peak signal strength received during the synchronizing intervals. An automatic gain control system of this type is satisfactory to a degree, so long as extraneous signals are not received with sufficient intensity to cause the peak rectifier system to respond excessively to this undesirably extraneous signal energy. If, however, the extraneous signal noise is of an excessive amplitude, the energy represented by the noise added to the sync peaks will cause the peak detector to produce an abnormal increase in rectified energy and therefore produce an abnormal increase in the automatic gain control potential which in turn results in a generally undesirable reduction of the receiver sensitivity following such noise. This, of course, interferes with proper operation of the receiver and not only produces fluctuations of the reproduced image brightness but may result in tearing out or other destructive disturbances in the image raster during periods directly following such noise bursts, in which, due to the reduced receiver gain, inadequate synchronizing information is applied to the synchronizing circuits. Furthermore, in such systems, the automatic gain control potential that is developed by each successive sync peak is generally stored on a condenser or applied to a circuit having a time constant such that the automatic gain control potential may for all practical purposes be maintained constant throughout one or more successive line intervals. Due to the very presence of this time constant such a circuit usually responds rapidly to high intensity noise pulses but does not allow the receiver to recover as quickly from the effects of noise as the receiver responds to noise.

The present invention overcomes in the most part the above disadvantages by means of a simple and novel circuit which extracts from the demodulated composite video signal, signal energy appearing between two datum amplitude levels and applies the energy so obtained to an integrating network such that the alternating voltage developed by the integrating network may be peak detected to in turn develop a substantially noise free automatic gain control voltage.

It is therefore one purpose of the present invention to provide an improved form of automatic gain control circuit particularly suited for application in television receiving systems.

It is another purpose of the present invention to provide an improved form of automatic gain control circuit which exhibits an extraordinary degree of noise immunity.

It is another purpose of the present invention to provide a particularly simple and economical arrangement for obtaining automatic gain control operation in television receivers such that a minimum of additional apparatus is necessary to realize the advantages of the present invention when applied to existing equipment.

Other objects, features and advantages of my invention will appear from the following description when taken in connection with the accompanying drawings in which.

Figure 1:
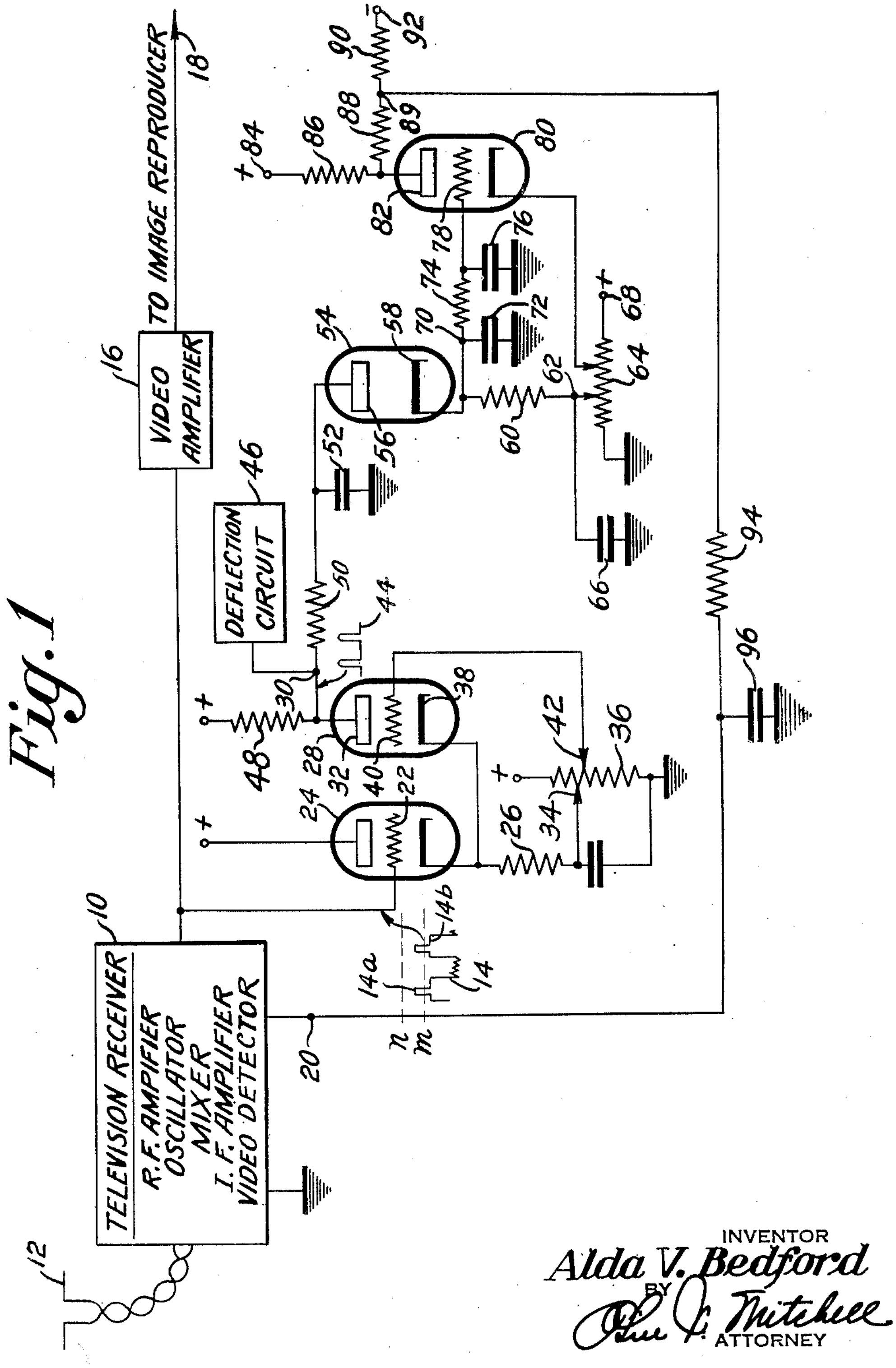
Figure 1 shows one form of the present invention as applied to a television receiving system.

Referring now to Figure 1, there is represented in block form at 10, the typical components of a conventional television receiver comprising an R. F. amplifier, an oscillator, a mixer, an I. F. amplifier, and a video demodulator. Examples of typical circuit arrangements applicable to the functions depicted by block 10 are given in an article entitled "Television Receivers" by Antony Wright appearing in the March 1947 issue of the RCA Review. Input radio frequency signal to the R. F. amplifier is conventionally provided by an antenna such as 12. The video signal shown at 14 as demodulated from the radio carrier is then applied to video amplifier 16, the output of which is supplied to some form of image reproducer as indicated by arrow 18. A terminal 20 is available on the receiver 10 for applying a unidirectional voltage for controlling of the gain of the television receiver.

The demodulated video signal 14 is also applied to the grid 22 of vacuum tube 24 which is cathode coupled by means of cathode resistor 26 to the vacuum tube 28. According to the present invention, the vacuum tubes 24 and 28, connected as shown, operate as a well-known form of D. C. coupled sync clipper-and-limiter amplifier stage for the incoming video signal 14. The D. C. information derived from the video demodulator in block 10 is then maintained through to the clipper-limiter output terminal 30 connected with the anode 32 of the vacuum tube 28. The lower clipping level $m$ shown superimposed upon the waveform 14, is established by plate current cutoff in vacuum tube 24 by returning the lower terminal of the cathode load resistor 26 to a source of positive D. C. potential available at tap 34 on bleeder resistor 36. The tap 34 is then adjusted to bias the vacuum tube 24 sufficiently beyond plate current cut-off so that plate current conduction in tube 24 will be caused only by signals positively in excess of level $m$. Correspondingly, the limiting level $n$ is established by vacuum tube 28 which has its cathode 38 directly connected to the cathode of vacuum tube 24. Input signals to vacuum tube 24 positively in excess of level $m$, such as the synchronizing portion 14$a$ of composite signal 14, are therefore passed by vacuum tube 24 and cause the cathode 38 of vacuum tube 28 to be driven in a positive direction. Since the grid 40 of vacuum tube 28 is held at a fixed potential relative to ground by its connection to variable tap 42 on bleeder resistor 36, the positive excursion of the cathode 38 will cause a positively extending pulse 44 to appear across the anode load resistor 48 of the vacuum tube 28. This pulse 44 then represents the portion of the input wave above level $m$ shown in connection with signal 14. If the potential at the tap 42 normally negative with respect to the cathode 38, is properly adjusted, positive excursions of input signal to level $m$ will cause the cathode 38 to in turn swing sufficiently positive to produce plate current cut-off in the vacuum tube 28 and hence establish the limiting action at level $n$ for the clipper-limiter combination. It is clear therefore that the amplitude differential embraced by these two datum amplitude levels may be adjusted by properly positioning the taps 34 and 42 on the bleeder resistor 36 connected to the positive potential source 44.

For proper contrast in the reproduced television image it is well known that a certain "working" or normal value of input signal must be maintained to the input of video amplifier 16 which in turn will supply the reproducing device with a fixed peak to peak value of modulating voltage. Consequently in using this clipper-limiter circuit in accordance with the present invention the two datum amplitude levels $m$ and $n$ are established relative to this working amplitude of the composite input signal 14, (such as waveform 14 will be construed to represent) such that clipping datum level $m$ is above the blankout pedestal level 14$b$ of the video signal whereas the upper datum amplitude or limiting level $n$ is substantially above the topmost extent or peak of sync represented at 14$a$. Therefore, provided the amplitude of the demodulated wave 14 is held at a constant value, the pulses 44 available at terminal 30 of the clipper-limiter circuit will be suitable for the timing of the horizontal and vertical deflection circuits represented by block 46. As will be seen as the specification proceeds, the information extracted from the composite signal 14 between the datum amplitude levels $m$ and $n$ will be treated in a novel manner to derive a correcting potential for application to terminal 20 of the receiver 10 such as to maintain the amplitude of the demodulated signal 14 at a substantially constant relationship with respect to the levels $m$ and $n$ and hence maintain the aforesaid proper clipping of synchronizing information for the deflection circuits 46 as well as a constant signal input to the video amplifier 16.

This automatic gain control action in conjunction with the particular embodiment shown in Figure 1 will now be described:

Signal information between the levels $m$ and $n$ available at terminal 30 is applied to an integrating network comprising resistor 50 and storage capacitor 52. The time constant of this R. C. integrating network 50 and 52 is normally made comparable to the duration of the sync pulse being used for the AGC, which in the exemplary illustration is the vertical sync pulse. This will then permit a pulsating unidirectional voltage due to integration of signal energy to appear across the capacitor 52, the peak amplitude of the voltage so developed being proportional to the received signal appearing between levels $m$ and $n$. This peak voltage is then measured by peak detector system including vacuum tube 54 having its anode 56 connected with the capacitor 52 and its cathode 58 connected through load resistor 60 to an adjustable tap 62 on bleeder resistor 64. By-pass capacitor 66 connected from the adjustable tap 62 to ground potential maintains the tap 62 at substantially A. C. ground potential while its position on bleeder resistor 64, connected with a positive source of potential 68, allows the cathode 58 to be placed at some positive potential with respect to ground. (It will be explained hereinafter how this potential provides the usual threshold action commonly used in AGC systems.) A unidirectional potential will then be developed at terminal 70 of storage capacitor 72 which is further filtered by resistor 74 and capictor 76 prior to application to the control grid 78 of D. C. amplifier vacuum tube 80. The anode 82 of the vacuum tube 80 is connected with a source of positive polarizing potential 84 through load resistor 86. Also connected with the anode 82 is a voltage dividing network compriisng resistor 88 and resistor 90 in turn connected with a source of negative potential 92. The resistors 88 and 90 are so proportioned relative to the resistor 86 and potential 84 that the voltage available at terminal 89 between the two bleeder resistors is of a negative value suitable for application through series resistor 94 to AGC bus terminal 20. One terminal of resistor 94 is connected with ground potential by capacitor 96 to form a filter network for the AGC voltage. Thus, should the amplitude of the demodulated signal 14 increase due to an increase in carrier amplitude, the vertical synchronizing pulse 14*a* will extend further above clipper datum level $m$ and apply pulses representing more energy to the integrating circuit 50 and 52. This results in a greater peak amplitude of the pulsating voltage developed across the capacitor 52 which in turn produces a positive rise in the unidirectional potential developed at terminal 70 of the diode load. This also produces a positive increase in the potential of the control grid 78 of the D. C. amplifier thereby increasing the current through the D. C. amplifier 80 and causing terminal 20 of the AGC bus to become more negative thereby reducing the gain of the television receiver. Correspondingly, a decrease in signal intensity will produce a reduction in the amplitude of the pulsating voltage developed across capacitor 52 and cause the AGC terminal 20 to become more positive thereby increasing the gain of the receiver. With proper proportioning of circuit parameters, this action can be made to maintain the amplitude of the demodulated signal 14 substantially constant over wide variations of input signals as picked up by the antenna 12.

Figure 2:
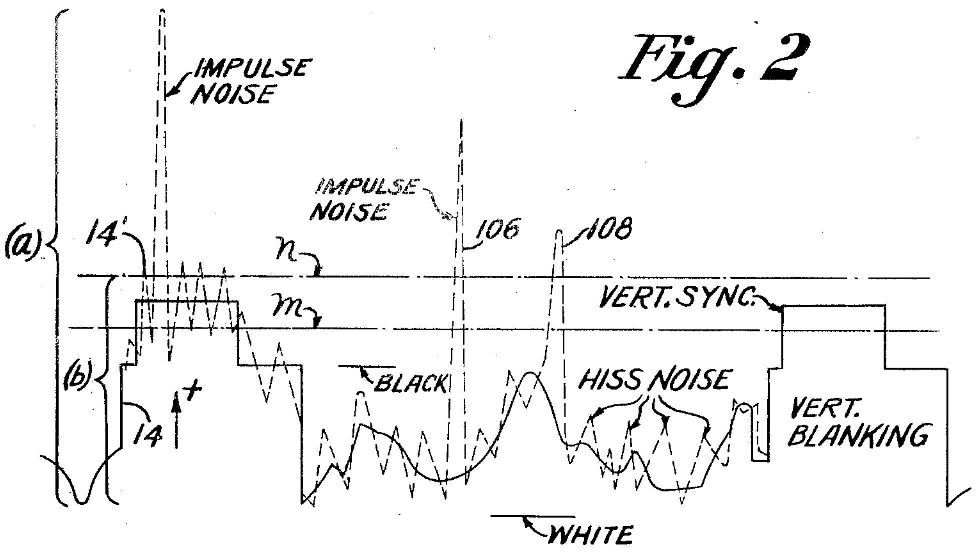
Figure 2 illustrates the effects of noise on a standard composite television signal.
Figure 3:
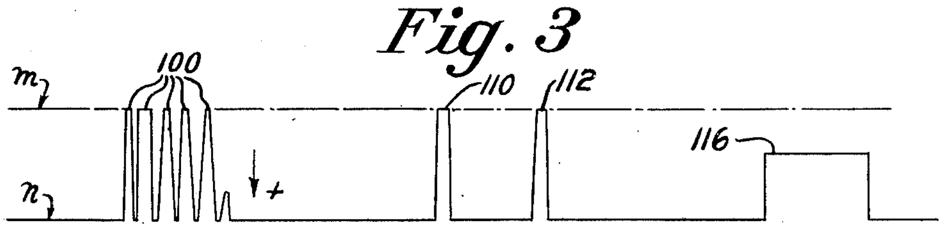
Figure 3 illustrates certain waveforms which may be developed and utilized in the practice of the present invention.
Figure 4:
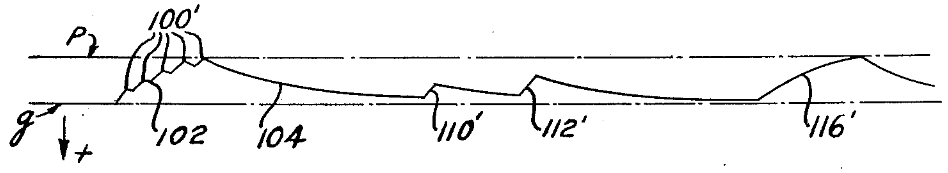
Figure 4 illustrates another waveform which is produced in the operation of the present invention.

Looking now to Figure 2, the signal 14 is drawn to a larger scale and is shown properly proportioned to the datum amplitude levels $m$ and $n$ for normal reception. The horizontal sync pulses have been omitted in this drawing in the interest of simplicity since they are relatively so narrow to have negligible effect on the AGC system due to the relatively long time constant of the integrating circuit comprising resistance 50 and condenser 52. Normal noise free signal 14 is shown in full solid line whereas noise conditions accompanying the reception of such a signal are illustrated by the dotted lines 14′. This overall noise pattern is considered to be made up of hiss noise and impulse noise and for purposes of illustration have been considered in a rather severe condition wherein the amplitude of even the hiss noise is sufficient to pass beyond the datum clipping and limiting levels $m$ and $n$ of the clipper-limiter stage during the recepition of the vertical sync pulse. Thus, as is shown in Figure 3, the information extracted by the clipper-limiter circuit for the noise serrated sync pulse would appear substantially as shown by the series of waves 100. This, of course, when applied to the integrating network comprising resistor 50 and capacitor 52 will produce across the capacitor 52, a waveform such as that shown at 102 of contour 104 in Figure 4. The peak amplitude of this excursion 102 resulting from the energy integrated during the vertical sync pulse may be represented by the distance between the levels $p$ and $g$ of Figure 4. This rise 102 made up of the individual energy increments 100′ representing the noise serration pulses 100, is then shown to be followed by two large impulse noise bursts 106 and 108 in Figure 2. These will respectively produce the pulses 110 and 112 between the levels $m$ and $n$ which when integrated produce the voltage rises 110′ and 112′. It can be seen that the peak amplitude of these rises 110′ and 112′ are substantially less than the rise produced by the noise serrated vertical sync pulse and will not cause an increase in the peak detector output potential at terminal 70. Finally, should a noise free vertical sync pulse be encountered, such as shown at 116 in Figure 3, it is evident that the corresponding integrated voltage rise 116′ (Figure 4) across capacitor 52 is substantially the same as that produced by the noise serrated sync pulse at 100 in Figure 3.

Thus, it is demonstrated that the peak of the integrated voltage wave resulting from successive synchronizing pulses is substantially independent of noise effects and that the integrated voltage rises across the capacitor 52 due to noise between successive vertical sync pulses have negligible effect due to the long time constant of the integrating network. Thus, the unidirectional control potential developed in accordance with the peak voltage excursions of the integrating wave provide a virtually noise free source of automatic gain control voltage.

It is well to note that in the practice of the present invention, an operating threshold must be established in the system at some point. This threshold may be established by the diode 54 by adjusting tap 62 such that the cathode 58 is established at a considerably positive potential relative to the anode 56 under conditions of no signal. This operation provides the conventional delay in the AGC action so that received signals must exceed a given threshold amplitude in order to produce an automatic gain control correcting potential. It is found convenient in the practice of the present invention to establish this threshold such that the top of vertical sync 14*a* is established, under normal operating conditions, approximately midway between the datum levels $m$ and $n$ as illustrated in Figure 2. This adjustment permits random hiss noise to extend beyond the datum levels $m$ and $n$ almost equally in both directions.

It is clear that the present invention, although having been described relative to an AGC system responsive to vertical synchronizing pulses, also finds ready application to a system designed for response to the video signal horizontal synchronizing component. In the horizontal sync responsive application the integrating circuit (for example resistor 50 and condenser 52) as well as AGC voltage filter circuits can be made with substantially shorter time constants. One of the advantages of such a horizontal sync responsive system is the faster action of the AGC obtained by merit of these shorter time constants. Furthermore care should be exercised to make the time constants short enough to minimize the effects of the longer duration vertical sync pulse component in order to avoid unduly reducing the receiver gain during the vertical pulse interval.

Attention is also drawn to the fact that the present invention lends itself readily to keyed operation if additional noise immunity is desired. In such an embodiment no signal would be applied to the integrating network except during vertical or horizontal synchronizing intervals. Thus noise received between synchronizing pulse could not cause AGC response.

From the foregoing it may be seen that the present invention provides a simple, economical, and effective type of AGC circuit which has an inherently high degree of noise immunity and provides stabilization of the demodulated signal with substantial precision over a wide range of input signal levels.

What is claimed is:

1. In a television radio receiving system for receiving and demodulating a radio carrier modulated by a composite image signal including a periodically recurrent synchronizing component representing a fixed percentage of radio carrier modulation, an automatic gain control system comprising in combination an amplitude discriminatory wave communicating circuit active to pass only those portions of applied waves established between an upper and lower datum amplitude level, means applying the demodulated composite signal to the input of said amplitude discriminatory wave communicating system, the amplitude of the composite signal so applied being nominally adjusted relative to said amplitude discriminatory circuit datum levels such that for reception of a radio carrier having a signal strength in excess of a given value, the peak of demodulated synchronizing component is established above the lower datum amplitude level but below the upper datum amplitude level, an integrating network connected with the output of said amplitude discriminatory circuit for developing a voltage wave in accordance with signal energy communicated by said amplitude discriminatory circuit, a rectifier having at least an input terminal and an output terminal, a connection from said integrating network to said rectifier input terminal for applying thereto the voltage wave developed by said integrating network, a connection from said rectifier output terminal to a load circuit for developing a unidirectional control potential in accordance with the peak amplitude of said integrating network voltage wave, and means connected with said load circuit for controlling the gain of said receiver in accordance with the correcting control potential developed in said load circuit.

2. In a radio receiving system for receiving and demodulating a radio carrier modulated by a composite wave including a periodically recurrent synchronizing component representing a fixed percentage of radio carrier modulation, an automatic gain control system comprising in combination, an amplitude discriminatory wave communicating circuit active to pass only those portions of applied waves established between two datum amplitude levels, means applying the demodulated composite signal to the input of said wave communicating circuit with such amplitude that under reception of a radio carrier having an intensity in excess of a predetermined value only a portion of said composite wave synchronizing component is established between said datum amplitude levels, a low-pass integrating network, a coupling from the output of said discriminatory wave communicating circuit to the input of said integrating network such that the peak-to-peak amplitude of the integrated voltage wave developed by said integrating network is a function of the received radio carrier amplitude, a voltage rectifying device connected with the output of said integrating network for developing a unidirectional potential in accordance with the peak-to-peak amplitude of the voltage wave developed by said integrating network, and means for controlling the gain of said receiver in accordance with unidirectional potential developed by said rectifying means.

3. In a television radio receiving system for receiving and demodulating a radio carrier modulated by a composite image signal including a periodically recurrent synchronizing component representing a respectively fixed percentage of radio carrier modulation, an automatic gain control system comprising in combination, means for selecting a portion of the demodulated composite signal appearing between two reference amplitudes falling only within the amplitude range embraced by the image signal synchronizing component, means for integrating the energy represented by that portion of the demodulated signal selected by said selecting means, and means responsive to the peak amplitude of the voltage wave produced by said integrating means for controlling the gain of said receiver in accordance with the amplitude of the demodulated composite signal.

ALDA V. BEDFORD.

References Cited in the file of this patent

UNITED STATES PATENTS

| Number | Name | Date |
|---|---|---|
| 2,158,261 | Urtel et al. | May 16, 1939 |
| 2,214,857 | Wilson | Sept. 17, 1940 |
| 2,227,056 | Blumlein et al. | Dec. 31, 1940 |
| 2,240,533 | Wilson | May 6, 1941 |
| 2,240,600 | Applegarth, Jr. | May 6, 1941 |
| 2,246,939 | Holmes | June 24, 1941 |
| 2 286,450 | White et al. | June 16, 1942 |
| 2,329,570 | Wellenstein et al. | Sept. 14, 1943 |
| 2,356,141 | Applegarth | Aug. 22, 1944 |
| 2,428,011 | Chatterjea et al. | Sept. 30, 1947 |
| 2,520,012 | Montgomery | Aug. 22, 1950 |
| 2,529,428 | Spielman | Nov. 7, 1950 |
| 2,538,772 | Ferrill, Jr. | Jan. 23, 1951 |
| 2,593,011 | Cotsworth | Apr. 15, 1952 |